L. G. DRYER.
TRACTOR ATTACHMENT.
APPLICATION FILED APR. 24, 1919.

1,313,677.

Patented Aug. 19, 1919.

INVENTOR
Lewis G. Dryer

BY
J. Wm Ellis
ATTORNEY

UNITED STATES PATENT OFFICE.

LEWIS G. DRYER, OF CATTARAUGUS, NEW YORK.

TRACTOR ATTACHMENT.

1,313,677. Specification of Letters Patent. Patented Aug. 19, 1919.

Application filed April 24, 1919. Serial No. 292,499.

*To all whom it may concern:*

Be it known that I, LEWIS G. DRYER, a citizen of the United States of America, and a resident of Cattaraugus, county of Cattaraugus, and State of New York, have invented certain new and useful Improvements in Tractor Attachments, of which the following is a full, clear, and exact description.

It is well known, that when using a tractor for plowing, it often becomes necessary, particularly when plowing on a grade, to change the position of the plow. This is accomplished by removing the clevis pin of the plow and placing it in one or the other of a number of holes, usually provided for this purpose in the draw bar of the tractor. This operation requires a good deal of time and it is difficult because of the inconvenience in getting the holes in the draw bar to register with the plow clevis. After the clevis pin has been placed in the new position the plow must be again tried and the pin moved to a different hole if the results are not as desired.

The general object of my invention has been to provide an attachment, whereby the plow may be permanently connected by means of the usual clevis pin and be moved to any desired position at will, without having to detach the plow.

Furthermore, when adjusting the position of the plow with my device it is not necessary for the operator to leave his seat, but the adjustment may be made to suit conditions while the tractor and plow are in operation. The plow may thus be adjusted to the proper and exact position.

The above objects and advantages have been accomplished by the device shown in the accompanying drawings, of which:

Figure 1:
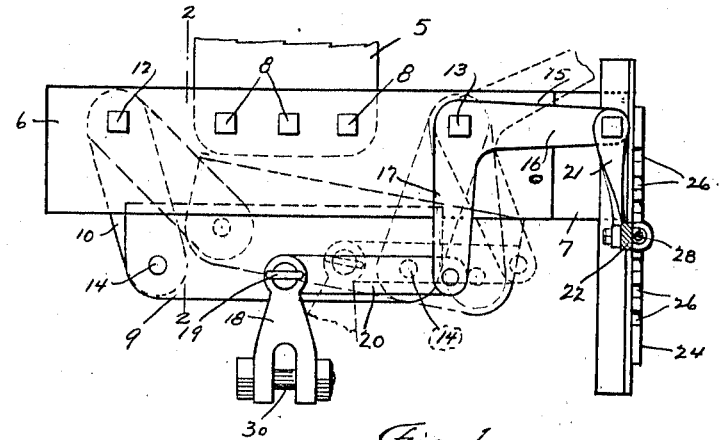
Figure 1 is a plan view of my device.
Figure 2:
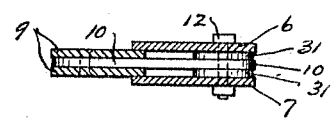
Fig. 2 is a sectional view taken on line 2—2 of Fig. 1.
Figure 3:
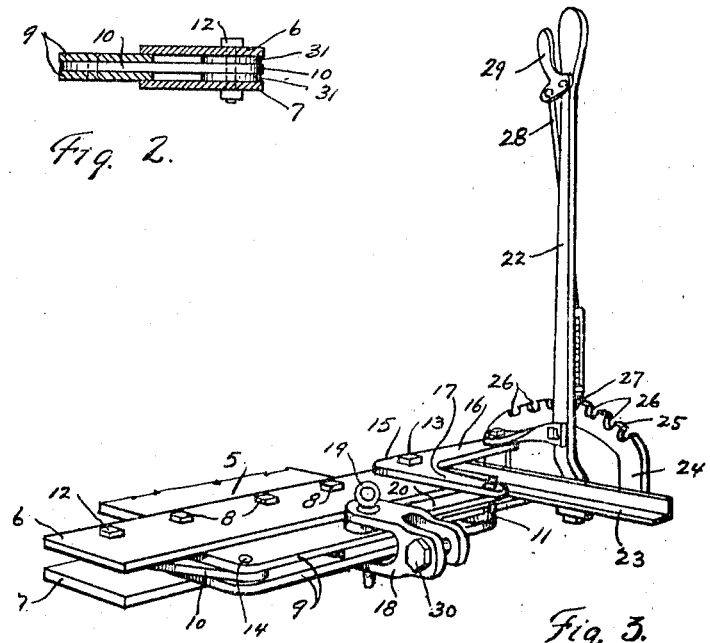
Fig. 3 is a perspective view of my device.

In the drawings 5 represents the draw bar of the tractor to which my device is permanently attached. My invention comprises body plates 6 and 7, which are bolted to the draw bar 5 of the tractor preferably by means of the bolts 8. Between the plates 6 and 7 are movably arranged a pair of clevis plates 9. These plates are connected with the body plates 6 and 7 by means of links 10 and 11. The inner ends of the links 10 and 11 are pivotally connected to the body plates 6 and 7 preferably by means of the bolts 12 and 13, respectively. The opposite ends of the links 10 and 11 are pivotally united to the clevis plates 9 by means of pins 14. The bolts 12 and 13 are spaced apart a greater distance than the pins 14, whereby the links are angularly arranged with respect to the end faces of the body plates 6 and 7 and the clevis plates 9. By this arrangement, when the clevis plates 9 are moved so as to occupy a position like that shown by the dotted lines in Fig. 1, the link 10, for instance, will assume an obtuse angle with the side faces of the clevis plates 9 and thus act as a strut to resist some of the side thrust of the plates 9 and to partially relieve the strain on the locking device. 31 are spacing washers, disposed between the inner ends of the links 10 and 11 and the body plates 6 and 7.

Carried by the body plate 6 and preferably pivotally connected therewith by means of the bolt 13 is a bell-crank lever 15 having arms 16 and 17. The arm 17 is connected with the clevis 18 of the plow by means of the clevis pin 19 and clevis link 20. The clevis 18 is provided with the usual bolt 30, by which a plow is attached to the device.

The arm 16 of the bell-crank lever extends outwardly and has a link 21 pivotally connected thereto. This link is connected at its opposite end to an operating lever 22. This operating lever is pivotally mounted at its lower end preferably to an angle-iron structure 23 carried by the body plate 7 of the device. An adjusting segment 24 is also carried by the angle-iron structure 23 and is provided in its upper, convex face 25 with a plurality of notches 26. The usual form of lock dog 27 is carried by a lock rod 28, slidably attached to the operating lever 22, and it is held into engagement with the notches 26 by means of a suitable spring of the usual and well-known form. A lock handle 29 is carried at the upper end of the operating lever 22 and is arranged to raise the lock dog out of engagement with the notches 26 when it is operated.

It will be seen that by operating the lever 22 the clevis plates 9 will be shifted laterally and will be locked in the adjusted position by the lock dog 27.

By means of my device, the plow or other implement attached to the clevis 18 may be quickly moved sidewise with relation to the tractor. This may be performed from the seat of the tractor while it is in operation and with great ease and certainty of results.

While I have described my invention for use in connection with a plow, it is obvious that the same may be used with equal efficiency in connection with any other farm implement.

Obviously, some modifications of the details herein shown and described may be made without departing from the spirit of my invention or the scope of the appended claims; and I do not, therefore, wish to be limited to the exact embodiment herein shown and described.

Having thus described my invention, what I claim is:

1. The combination, with a tractor, of an attachment comprising a stationary member, rigidly connected to the tractor, a movable member, having a free swinging movement, and means for pivotally connecting the stationary and movable members so that they will assume a normal, substantially parallel relation to each other, the longitudinal planes of the members lying at substantially right angles to the line of travel of the tractor.

2. The combination, with a tractor, of an attachment comprising a stationary member, rigidly connected to the tractor, a movable member, having a free swinging movement, links for pivotally connecting the stationary and movable members so that they will assume a normal, substantially parallel relation to each other, the longitudinal planes of the members lying at substantially right angles to the line of travel of the tractor.

3. The combination, with a tractor, of an attachment comprising a stationary member, rigidly connected to the tractor, a movable member, having a free swinging movement, means for pivotally connecting the stationary and movable members so that they will assume a normal, substantially parallel relation to each other, the longitudinal planes of the members lying at substantially right angles to the line of travel of the tractor, an operating lever pivotally carried by the stationary member, and means connecting the lever with the stationary member.

4. The combination, with a tractor, of an attachment comprising a stationary member, rigidly connected to the tractor, a movable member, having a free swinging movement, means for pivotally connecting the stationary and movable members so that they will assume a normal, substantially parallel relation to each other, the longitudinal planes of the members lying at substantially right angles to the line of travel of the tractor, a clevis carried by the movable member, an operating lever pivotally carried by the stationary member, a bell-crank lever carried by the stationary member, and links connecting the movable member with the operating lever, whereby the movable member is adjusted laterally.

5. A tractor attachment comprising a stationary member, a movable member, links connected at one of their ends to the stationary member and at their opposite ends to the movable member, the ends secured to the movable member being closer together than the other ends, and means for operating the movable member, whereby one or the other of said links will act as a strut when the movable member is swung to one side or the other.

6. The combination, with a tractor, of an attachment comprising a stationary member, rigidly connected to the tractor, a movable member, having a free swinging movement, means for pivotally connecting the stationary and movable members so that they will assume a normal, substantially parallel relation to each other, the longitudinal planes of the members lying at substantially right angles to the line of travel of the tractor, an operating lever pivotally carried by the stationary member, segmental locking means for the lever, and means connecting the lever with the movable member.

In witness whereof I have hereunto signed my name.

LEWIS G. DRYER.